(12) United States Patent
Stretton et al.

(10) Patent No.: US 7,810,312 B2
(45) Date of Patent: Oct. 12, 2010

(54) HEAT EXCHANGER ARRANGEMENT

(75) Inventors: Richard G Stretton, Loughborough (GB); Martyn Richards, Burton on Trent (GB)

(73) Assignee: Rolls-Royce plc, London (GB)

( * ) Notice: Subject to any disclaimer, the term of this patent is extended or adjusted under 35 U.S.C. 154(b) by 642 days.

(21) Appl. No.: 11/785,590

(22) Filed: Apr. 18, 2007

(65) Prior Publication Data

US 2007/0245738 A1   Oct. 25, 2007

(30) Foreign Application Priority Data

Apr. 20, 2006   (GB) .................................. 0607771.3

(51) Int. Cl.
*F02K 99/00*   (2009.01)
(52) U.S. Cl. .................... 60/266; 60/226.1; 60/267; 60/782; 60/785; 60/806
(58) Field of Classification Search ................ 60/226.1, 60/266, 267, 782, 785, 806
See application file for complete search history.

(56) References Cited

U.S. PATENT DOCUMENTS 4,254,618 A * 3/1981 Elovic ...................... 60/226.1
4,791,782 A   12/1988 Seed
5,351,476 A   10/1994 Laborie
5,438,823 A *  8/1995 Loxley et al. ............. 60/39.08
5,729,969 A   3/1998 Porte

FOREIGN PATENT DOCUMENTS

GB   2 208 702 A   4/1989
GB   2 224 080 A   4/1990

* cited by examiner

*Primary Examiner*—Michael Cuff
*Assistant Examiner*—Craig Kim
(74) *Attorney, Agent, or Firm*—Jeffrey S. Melcher; Manelli Denison & Selter PLLC (57) ABSTRACT

In certain circumstances recovery of a fluid flow presented through a heat exchanger into another flow can create problems with respect to drag and loss of thrust. In gas turbine engines heat exchangers are utilized for providing cooling of other flows such as in relation to compressor air taken from the core of the engine and utilized for cabin ventilation and de-icing functions. By providing an outlet valve through an outlet duct in a wall of a housing the exhaust fluid flow from the heat exchanger can be returned to the by-pass flow with reduced drag effects whilst recovering thrust. The valve may take the form of a flap displaceable into the by-pass flow before an exit plan to create a reduction in static pressure drawing fluid flow through the heat exchanger.

12 Claims, 7 Drawing Sheets

HEAT EXCHANGER ARRANGEMENT

CROSS-REFERENCE TO RELATED APPLICATIONS

This application claims priority to GB 0607771.3, filed 20 April 2006 and currently issued under United Kingdom Patent No. 2,437,377.

BACKGROUND OF THE INVENTION

The present invention relates to heat exchanger arrangements and more particularly to heat exchanger arrangements utilised in gas turbine engines for cooling fluid flows such as with respect to ventilation air or oil within the engine or for de-icing.

Operation of gas turbine engines is well known and incorporates significant fluid flows including compressed air provided by the compressor fans of that gas turbine engine. This compressed air flow is bled for a number of functional operations and in particular in order to provide through an appropriate heat exchanger cooling of other fluid flows such as the ventilation air in the cabin of an aircraft associated with a gas turbine engine or potentially with respect to fuel or lubricating oil coolers in the engine. The coolant flow, as indicated, is tapped or bled from the engine flows and returned at an appropriate location within the engine to maintain a pressure drop sufficient to provide the necessary cooling function within the heat exchanger with respect to the ventilation air or other fluid flow through that heat exchanger. The ventilation air itself is generally taken from hotter core compressor stages of the engine and so needs cooling at least during certain engine cycles.

Figure 1:
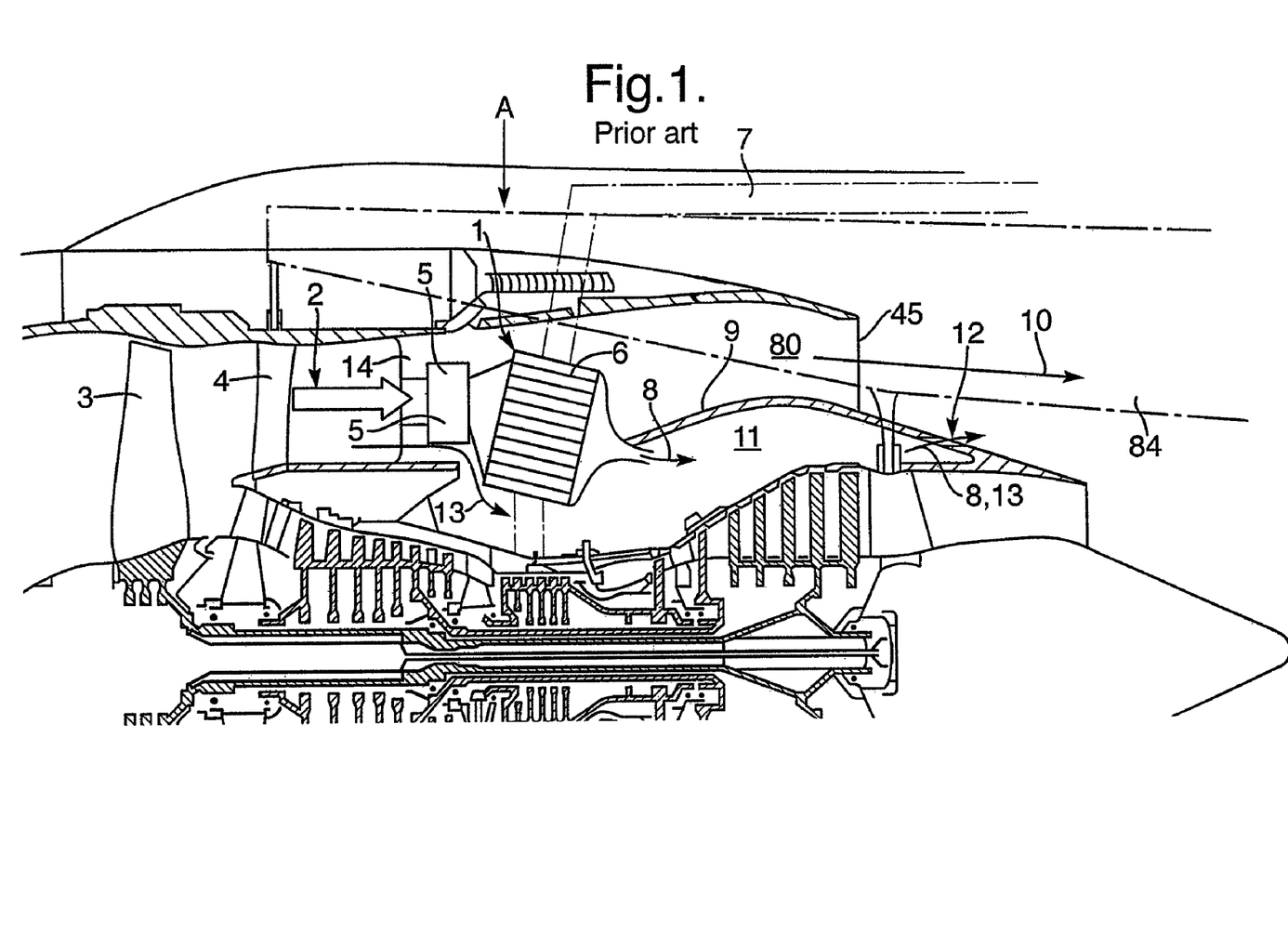
FIG. 1 is a schematic side view of a prior art heat exchanger arrangement.
Figure 2:
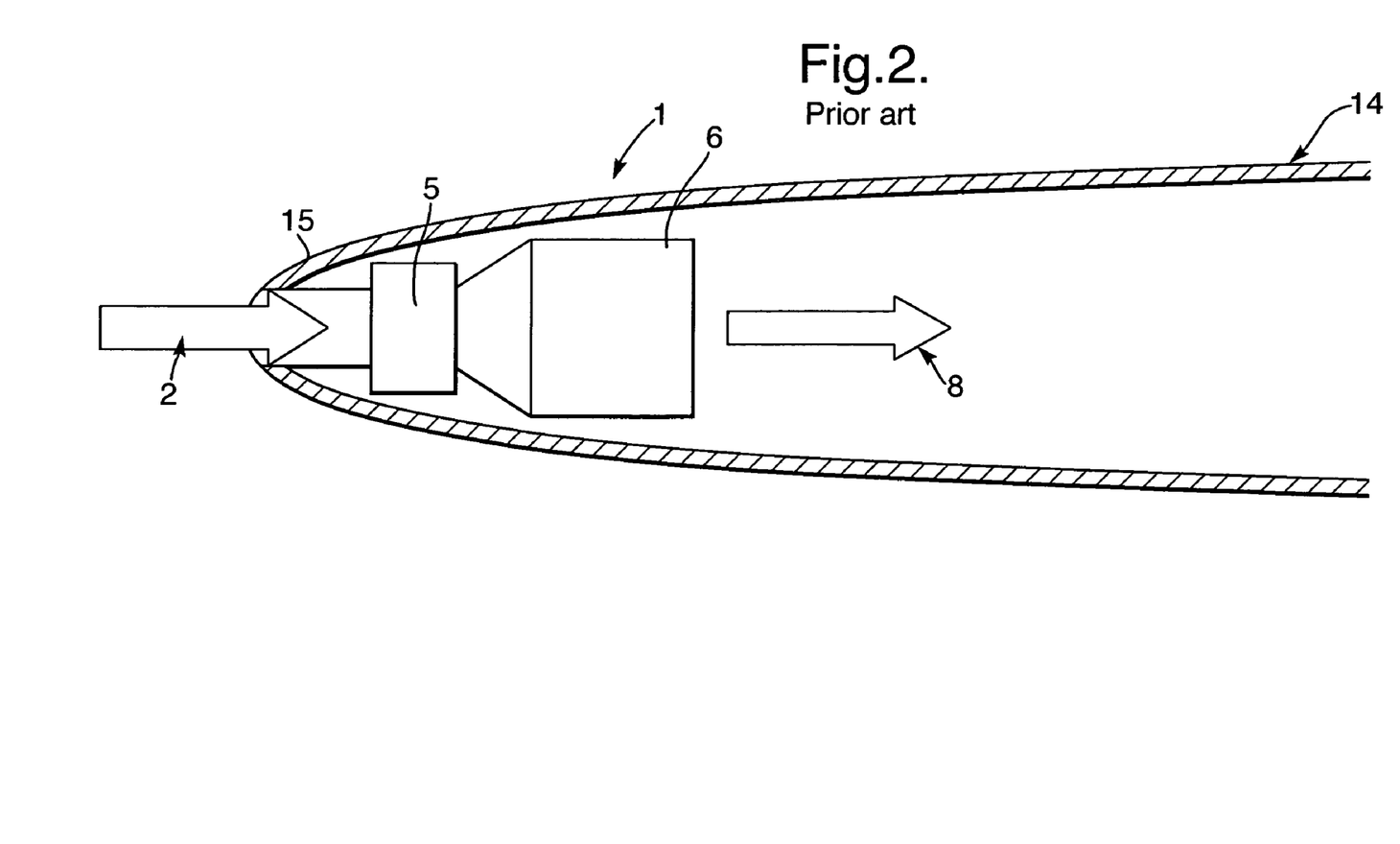
FIG. 2 is a plan view in the direction of A of the prior art heat exchanger arrangement depicted in FIG. 1.

Prior Art FIGS. 1 and 2 respectively illustrate a schematic side view of a prior heat exchanger arrangement (FIG. 1) and a plan view (FIG. 2) in the direction of A of the heat exchanger arrangement depicted in Prior Art FIG. 1. Thus, the arrangement 1 includes a fluid flow 2 taken from compressor stage 3 air flow generally after a guide vane 4. The bled fluid flow 2 is regulated by a fan air valve 5 such that the fluid flow passes as a coolant through a heat exchanger 6 which exchanges heat with typically another fluid delivered through ducting 7 (shown in broken line). This other fluid is generally a cooled air flow which may be used as the ventilation air for the cabin of an aircraft associated with a gas turbine engine. The fluid flow 2 having been regulated by the valve 5 and passing through the heat exchanger 6 is exhausted as an exhaust flow 8 out of the heat exchanger 6. The heat exchanger 6 and valve 5 are located within a wall 15 of a housing 14, usually known as a splitter fairing, which is generally part of the core nacelle fixing structure of an engine. The exhausted flow 8 mixes with a ventilation flow 13 in a zone 11 that is located radially inwardly of a core cowling 9 and surrounding the engine. In such circumstances the prior heat exchanger arrangement depicted in Prior Art FIGS. 1 and 2 has a number of disadvantages particularly in relation to increasing the temperature in the zone 11 between the housing incorporated in the heat exchanger 6 and surrounding parts of the engine as well as a necessary large vent exit area 12 to generate the desired pressure drop across the heat exchanger resulting in drag to a main propulsive flow 10 when flow through the heat exchanger 6 is low.

In the above circumstances although dumping of the exhaust flow 8 appears to be a relatively simple procedure, there are a number of problems. It will be understood that the exit area 12 has to be sized to cope with the combined ventilation flow 13 and the highest heat exchanger exhaust flow 8 which means that, typically at cruise, when the heat exchanger is operating at low or zero levels it is not possible to recover thrust from this part of the engine as the vent 12 area is effectively oversized. This over sizing also creates a drag penalty as the vent area 12 acts as an aero dynamic step or discontinuity when it is not passing full flow. It will also be understood that extra heat input into the zone 11 requires considerable shielding and heat resistance cabling for the core mounted systems. It will also be understood that by provision of the valve 5 and therefore switchable nature with regard to the flow through the heat exchanger 6 it is difficult to tune the flow regimes in the event of a fire to ensure extinguishants achieve the required density in all parts of zone 11.

SUMMARY OF THE INVENTION

In accordance with aspects of the present invention there is provided a heat exchanger arrangement for a gas turbine engine, the arrangement comprising a fluid flow presented to a heat exchanger at an inlet and the heat exchanger incorporated within a housing over which in use the fluid flow passes, the arrangement characterised in that the heat exchanger has a duct to an outlet valve and the outlet valve is displaceable into the fluid flow to generate a reduction in static pressure in use to draw fluid flow through the heat exchanger.

Generally, the outlet valve is upstream of a fan nozzle exit plane.

Typically, the outlet valve is in a wall of the housing.

Advantageously, the outlet valve comprises a hinged flap.

Generally, the static pressure is variable by specific displacement of the valve.

Generally, the valve is opposite a shroud wall providing a fixed cross-sectional area within which the valve is operable.

Generally, the heat exchanger is for cooling an other fluid flow. Typically, the other fluid flow is ventilation air or oil.

Typically, the housing comprises a mounting nacelle for a gas turbine engine.

The invention also includes a gas turbine engine including an arrangement as described above.

BRIEF DESCRIPTION OF THE DRAWINGS

Embodiments of the present invention will now be described by way of example only with reference to the accompanying drawings in which.

DETAILED DESCRIPTION OF THE INVENTION

In accordance with aspects of the present invention a heat exchanger 26 acting as a pre-cooler system for a gas turbine engine is arranged such that the coolant fluid flow exhaust is kept separate from the zone 11. Nevertheless, an important factor to achieve appropriate heat exchanger operation is to provide an adequate pressure drop across the heat exchanger, that is to say from the coolant inlet to the coolant outlet sides. Previously such a pressure drop necessitated the exhausts of the coolant to be ducted downstream of the nozzle exit plane (45) where the adequate reduction in static pressure can be achieved. It will be understood that through the various compressor stages of a gas turbine engine compressed air flows increase and therefore by appropriate ducting to higher flow rates the coolant flow can be sucked through the heat exchanger.

By aspects of the present invention a reduction in static pressure is achieved without requiring considerable ducting which would otherwise introduce problems with respect to weight and flow losses. In accordance with aspects of the present invention the coolant fluid flow from the heat exchanger is injected into a fan by-pass flow relatively close to the heat exchanger through an outlet valve. This outlet valve is configured through its geometry to generate a reduction in static pressure at the exhaust side to create the required pressure drop through the heat exchanger.

Figure 3:
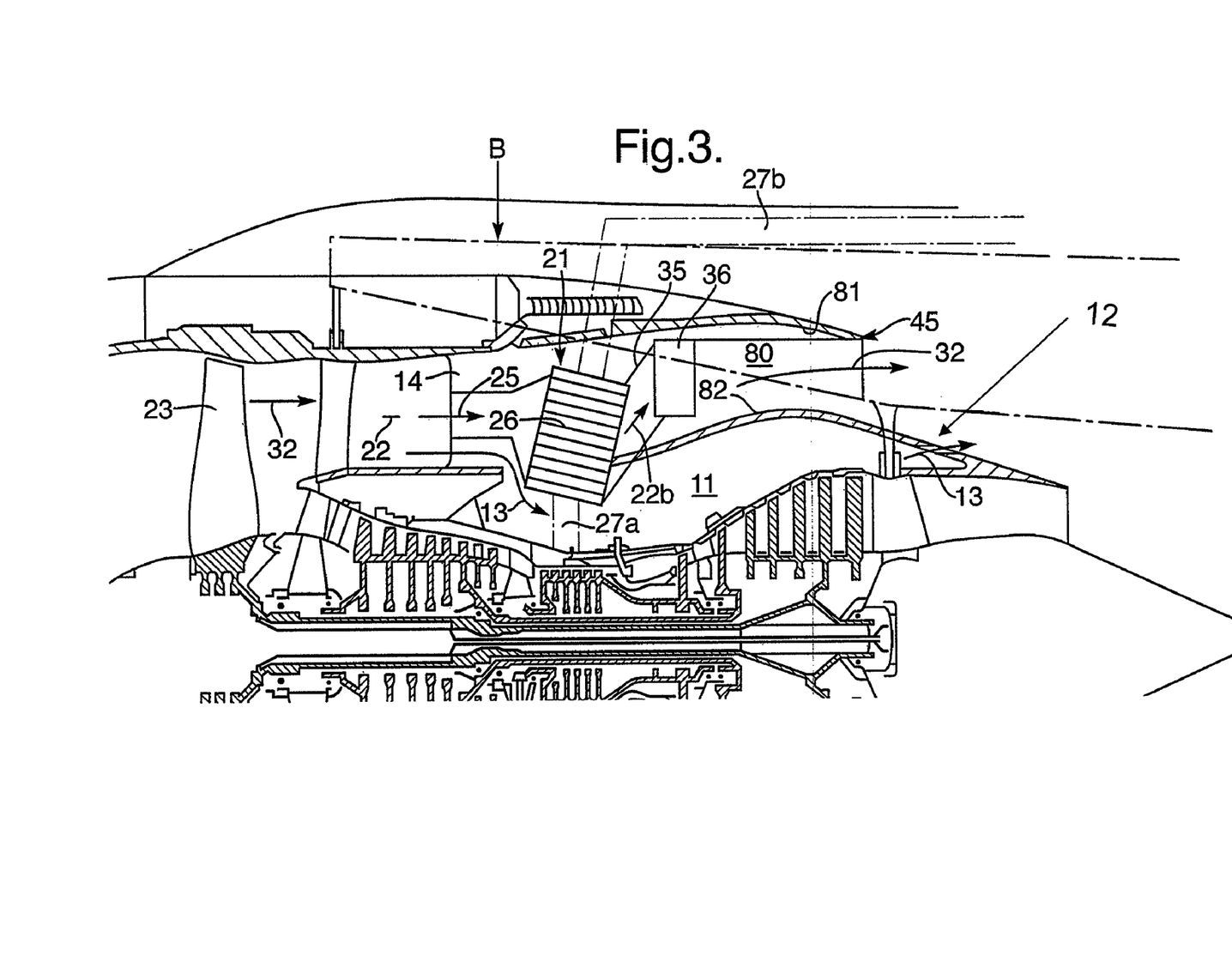
FIG. 3 is a schematic side view of a first embodiment of a heat exchanger arrangement in accordance with aspects of the present invention.
Figure 4:
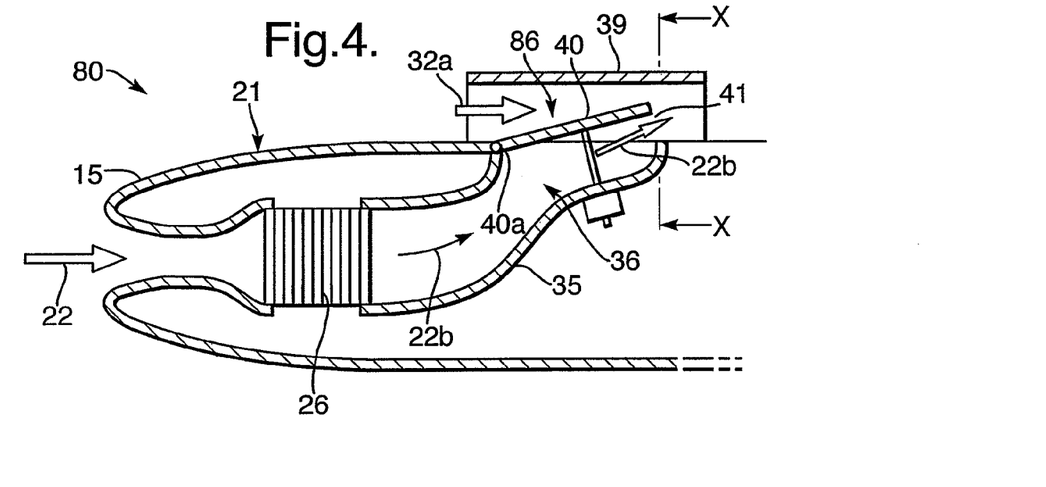
FIG. 4 is a schematic plan view in the direction B of the arrangement depicted in FIG. 3 with an outlet valve in an open configuration.
Figure 5:
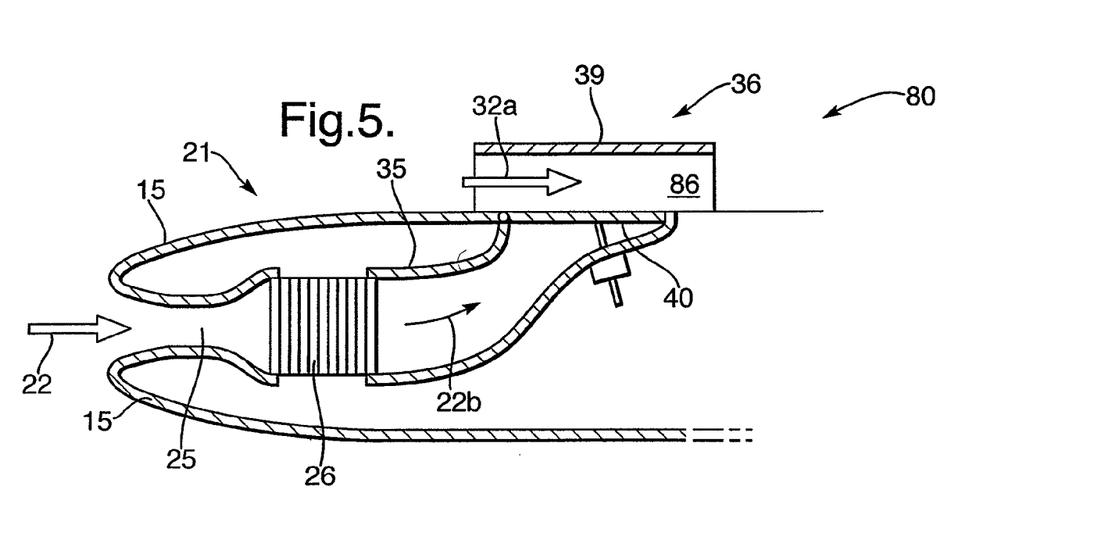
FIG. 5 is a schematic plan view in the direction B of the arrangement depicted in FIG. 3 with an outlet valve in a closed configuration.

FIGS. 3 to 5 illustrate a first embodiment of a heat exchanger arrangement 21 in accordance with aspects of the present invention. Thus, the arrangement 21 has a heat exchanger 26 to act as a pre-cooler for another fluid such as the ventilation air for the cabin of an aircraft. Conduits for that other cooled fluid are shown by broken lines 27a, 27b in FIG. 3. The heat exchanger 26 receives a coolant fluid flow 22 through an inlet 25. The regulating fan air valve, as with the previous arrangement depicted in prior art FIGS. 1 and 2 is not required and therefore removed. The heat exchanger 26 receives the coolant fluid flow 22 and exhausts that flow through ducting 35 to an outlet valve 36. This valve 36 is shown schematically in FIG. 3 and as more closely depicted in FIGS. 4 to 5 and extends into a by-pass fluid flow 32 in order to generate a reduction of static pressure and so suck coolant flow 22b through the heat exchanger 26.

By provision of a heat exchanger geometry and particularly in respect of the exhaust duct 35 with a variable flap valve 40 acting as the outlet valve 36 it will be understood that the efficiency of the heat exchanger 26 can be maintained by the pressure drop across that heat exchanger 26 between the inlet duct 25 and the outlet duct 35 without the necessity of long conduits to downstream by-pass flow areas of an engine.

The coolant flow 22 is generally generated by a compressor fan 23 and is part of the propulsive fan flow 32. The heat exchanger 26 as well as the ducting 35 and outlet valve 36 are generally mounted within the wall structure 15 of an inner nacelle housing 14 (splitter fairing) or mounting structure or pylon 84, as shown in FIG. 1, for an engine. The wall structure 15 is a bifurcation structure, commonly located at top and/or bottom of the engine when wing mounted, and which spans the bypass duct 80.

The outlet valve 36 extends radially between the bypass duct's radially inner and outer walls 82, 81 respectively. The outlet valve 36 may extend the complete radial height of between walls 81, 82, but in this example the valve 36 extends over part of the radial height.

During heat exchanger operation, the variable flap 40 of the outlet valve 36 protrudes into the fan by-pass flow 32. In the first embodiment depicted in FIGS. 3 to 5, a portion 32a of this by-pass flow 32 is enclosed between the housing wall 15 and a shroud wall 39. The velocity of the portion of flow 32a increases as the variable flap 40 protrudes and reduces the flow area, particularly at the valve's outlet. Increasing speed of the by-pass fan flow 32 adjacent to the valve 36 drops the static pressure at an exhaust plane of the valve 36 creating a suction effect which increases the pressure drop across the heat exchanger 26 so driving coolant fluid flow through that heat exchanger 26. It will be understood that in a preferred embodiment the outlet valve comprises a flap hinged to one side and displaceable to vary the degree of protrusion into the by-pass flow 32 and so allows alterations with respect to the suction effect as a result of the pressure drop across the heat exchanger 26. This variation in the valve 26 will allow optimisation with respect to cooling requirements.

It will also be understood as the exhaust flow 22b from the heat exchanger 26 does not interfere with the ventilation zone flows (zone 11 in prior art FIG. 1). Thus for the arrangement of the present invention, over-sizing of the vent outlet 12 is not required and a suitably sized outlet 12 is used for maximum thrust recovery and/or flow disturbance from the ventilation air flow.

It will be noted that the outlet valve 36 is located upstream of a fan nozzle exit plane 45 (FIGS. 3 and 4). Such position ensures that there is thrust recovery if required.

FIG. 4 and FIG. 5 illustrate respectively open and closed configurations with regard to heat exchanger arrangements in accordance with the first embodiment of the present invention. As described previously, a fluid flow 22 acts as a coolant for the heat exchanger 26 and this is exhausted through a duct 35 such that an outlet valve 36 including the variable flap 40 can create variation in the static pressure, at the duct's outlet, to suck fluid flow 22 through the heat exchanger 26.

In FIG. 4 the flap 40 is in an open configuration such that fluid flow 22b is drawn through an aperture 41 between the flap 40 and parts of the duct 35 or housing 15. This flow through the heat exchanger 36 will provide a cooling effect with regard to another flow such as compressor air from the turbine stages of an engine to be used for cabin ventilation or de-icing. The flap 40 position creates a low static pressure, local to and importantly immediately downstream of the flap 40, in a by-pass duct 80 created between the housing 15 and a shroud wall 39 as described previously. This variation in static pressure will act to regulate the fluid flow 22 instead or as well as of the previous fan air valve (5 in prior art FIG. 1 and prior art FIG. 2).

Figure 4A:
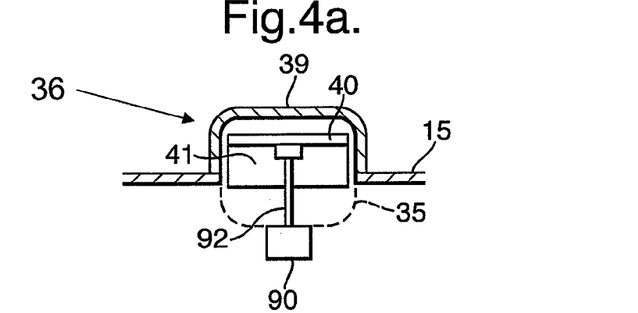
FIG. 4a is a section X-X in FIG. 5 of the outlet valve.

FIG. 4a shows the outlet valve 36 in the direction X-X. Thus, as can be seen, the flap 40 protrudes into the gap between the shroud 39 and parts of the housing wall 15 in order to present the aperture 41 through which flow 22b passes when drawn as a result of the reduced static pressure.

By having a fixed shroud wall 39 and wall 15 it will be understood that a well-defined flow 32 conduit is created local to the flap 40 giving greater control of the flow conditions adjacent to the duct 35 exhaust. In such circumstances the disturbance as a result of the flap 40 protruding into that conduit will create the desired variations in static pressure and therefore flow rate through the heat exchanger 26. When the flap is forced into a closed configuration as depicted in FIG. 5, it will be understood that there will be no fluid flow 22 through the duct 25 to the heat exchanger 26. The flap is closed, therefore there will be no flow 22b through the conduit 35 and in such circumstances normal fan flow 32 can be presented without any drag or impingement as a result of the exhaust flow 22b from the heat exchanger 26 as described previously. By such an approach the prior necessity of having an outlet vent which is appropriately sized for highest expected conditions is avoided. Fluid flow 22 through the heat exchanger 26 can be adjusted dependent upon actual requirements and this flow recovered in combination with the by-pass flow 32 for greater engine efficiency. By providing a fixed shroud wall 39 it will be understood that an accentuation of the static pressure reduction effects of flap 40 can be achieved.

The variable flap 40 is rotatable about its upstream edge 40a and in an open position defines a converging passage 86. Fluid flow 32a therefore accelerates and creates a low static pressure local to the outlet plane 41. The variable flap 40 is moveable between a closed position (FIG. 5) and an open position (FIG. 4) via an actuation mechanism. One such actuation mechanism comprising a motor 90 having a drive arm 92 connected to the flap 40. The motor 90 is mounted to a wall of the duct 35. The motor 90 is operable via electronics as would be understood by the skilled person. The motor 90 is operable to vary the amount of flow 22b through the valve 36 to maximise thrust recovery. As the flap 40 may be closed completely, the flap and drive mechanism 90, 92 is capable of operating as the inlet valve 5, which in this case is omitted.

Figure 6:
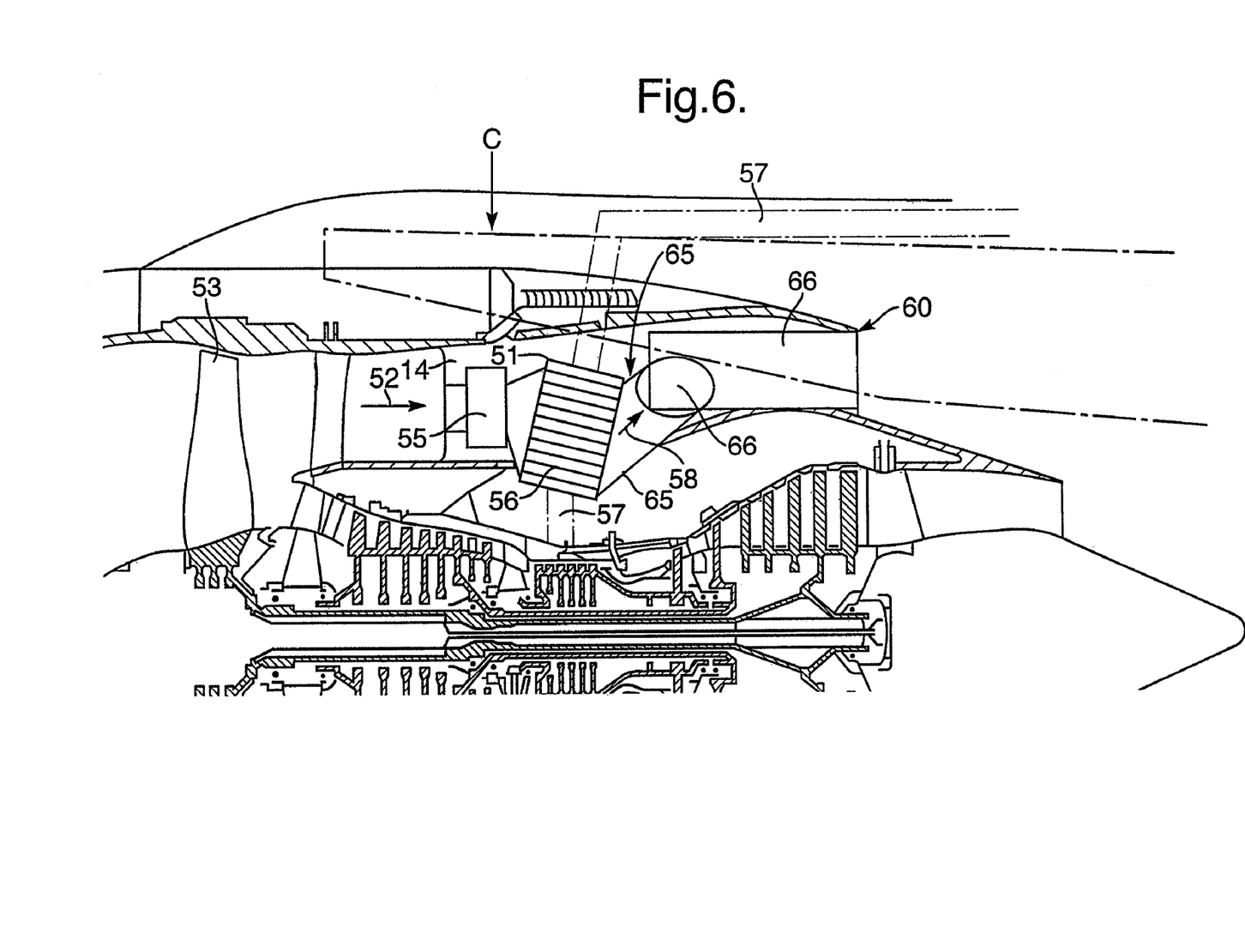
FIG. 6 is a schematic side view of a second embodiment of a heat exchanger arrangement in accordance with aspects of the present invention.

Alternatively, a second embodiment in accordance with aspects of the present invention is depicted in FIGS. 6 to 9. In this embodiment, an elongated flap is utilised in order to again create a static pressure reduction to stimulate and regulate fluid flow through the heat exchanger. As previously, a compressor fan 53 provides a bypass fluid flow 52, part of which fluid flow 52a is presented to a heat exchanger 56 which in the embodiment depicted in FIGS. 6 to 9 also includes a fan air valve 55. As previously, the heat exchanger 56 exhausts an exhaust fluid flow 58 through a conduit 65 to a valve 66. The fluid flow through the heat exchanger 56 cools another flow generally comprising compressed air in a conduit 57 in order to act as cabin ventilation or de-icer flows for operations within an aircraft associated with an engine incorporating a heat exchanger arrangement 51 in accordance with aspects of the present invention. The outlet valve 66 is schematically depicted in FIG. 6 but as can be seen in more detail in FIG. 7 this valve comprises a hinged flap 70 secured about a hinge 71.

As described previously with regard to the flap 40 in FIGS. 3 to 5, the flap 70 is displaceable in order to vary a gap between the exhaust conduit 65 and parts of a housing 14 within which the heat exchanger 56 is located. In such circumstances there is a reduction in the static pressure as a result of fluid flow 78 moving past the flap 70. This reduction in static pressure will suck fluid flow 52 as a coolant through the heat exchanger 56 for appropriate operation.

Generally, the flap 70 will be displaceable about the hinge 71 and come into a kiss seal engagement with parts of the housing 14 and the duct 65.

In the second embodiment there is no provision of an opposed shroud wall 39 as depicted in FIGS. 3 to 5 and so the embodiment depicted in FIGS. 6 to 9 is dependent upon the combination of the fan by-pass fluid flow 78 and the flap 70 creating sufficient suction through a static pressure drop without the constraint of a conduit formed between the housing 14 and an opposed shroud wall such as wall 39 in FIGS. 3 to 5. In such circumstances as described above, typically the flap 70 will be more elongate than the flap 40 depicted in FIGS. 3 to 5 in order to take the exhaust flow 58 further downstream to generate sufficient static pressure reduction. However, the particular advantage of such an arrangement is that there is less drag/blockage due to deletion of the fixed shroud wall 39 and housing wall 14 in the first embodiment depicted in FIGS. 3 to 6. The second embodiment depicted in FIGS. 6 to 9 will require more space for accommodation but as indicated may have less detrimental effects with regard to drag and blockage. The particular embodiment utilised for the outlet valve in accordance with aspects of the present invention will be dependent upon particular requirements within a gas turbine engine.

Figure 7:
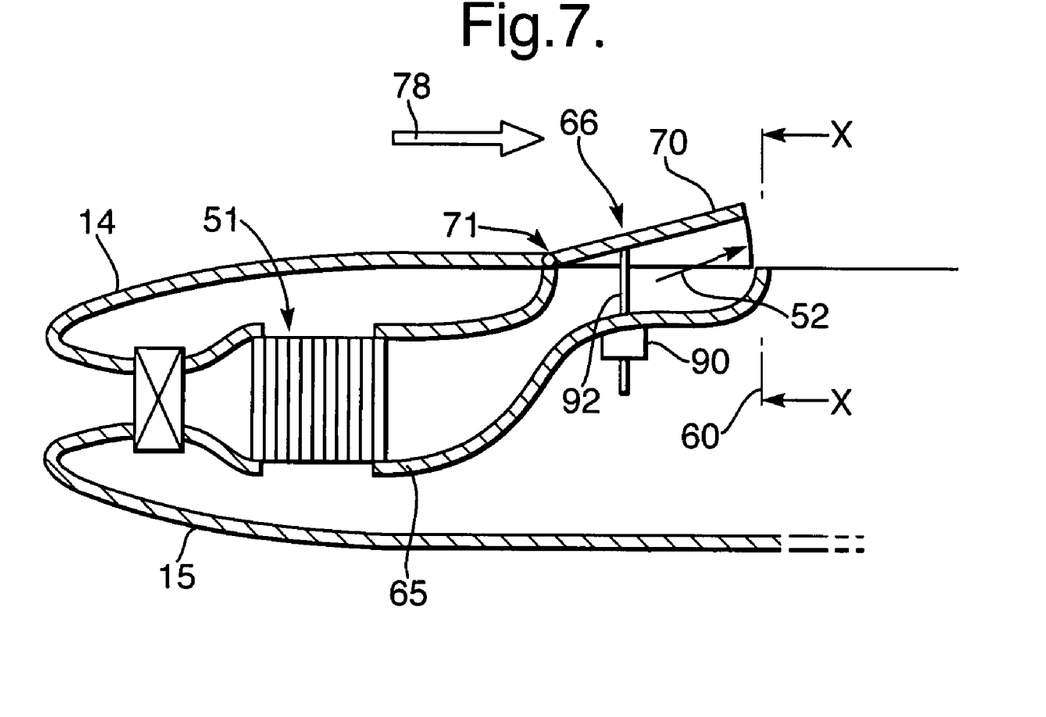
FIG. 7 is a schematic plan view in the direction of arrowhead C of the heat exchanger arrangement depicted in FIG. 6.
Figure 7A:
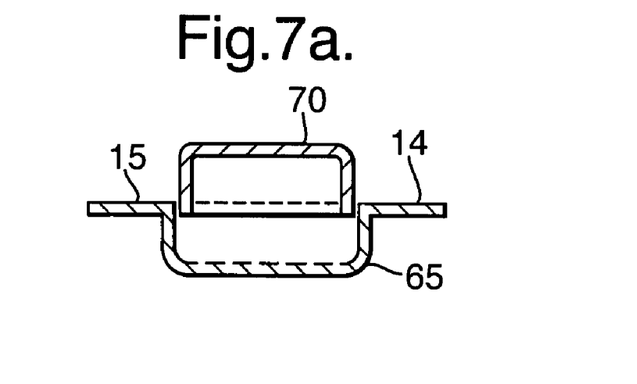
FIG. 7a is a section X-X in FIG. 7 of the outlet valve.
Figure 8:
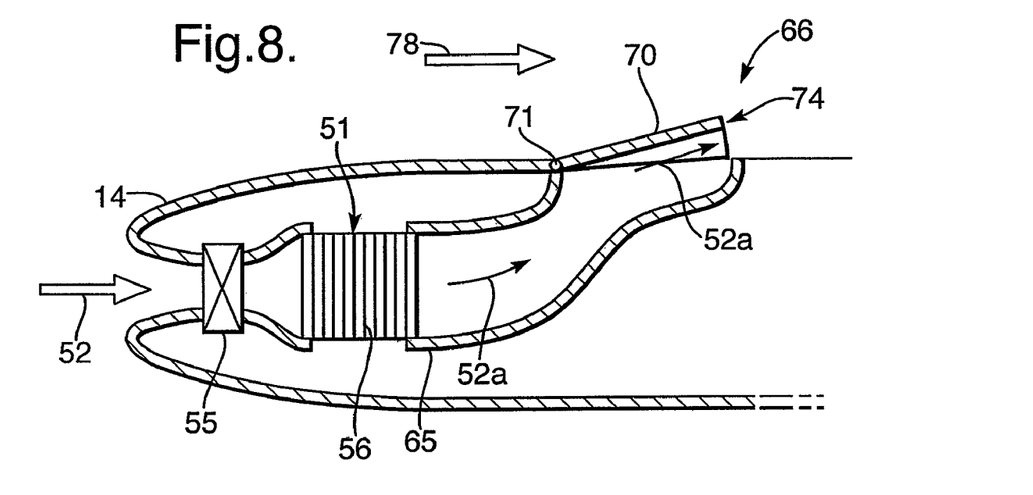
FIG. 8 is a schematic side view of the second embodiment of the heat exchanger depicted in FIGS. 6 and 7 in an open configuration; and, FIG. 9 is a schematic plan view of the heat exchanger depicted in FIGS. 6 to 8 in a closed configuration.
Figure 9:
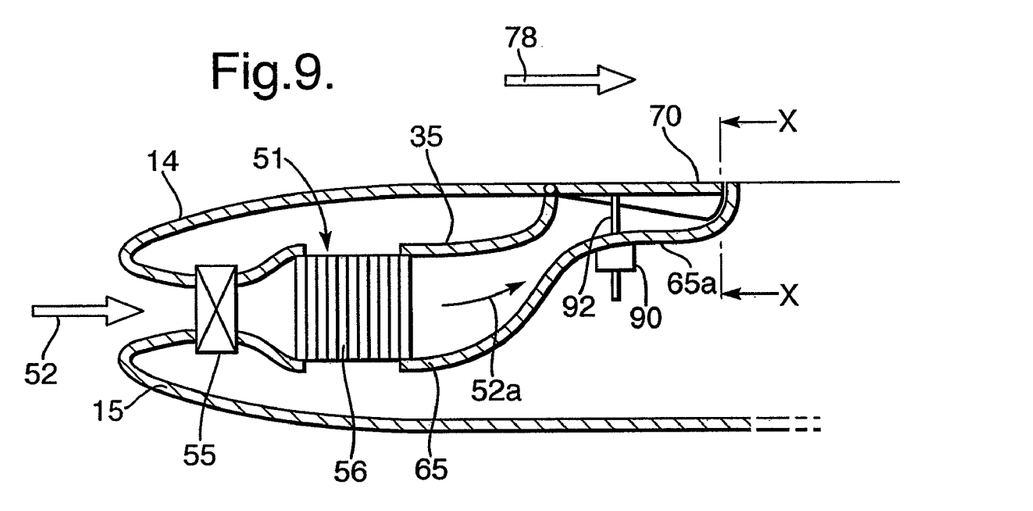
Figure 9A:
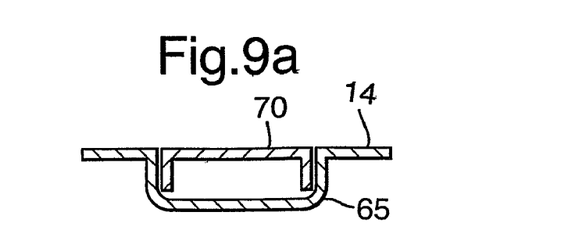
FIG. 9a is a section X-X in FIG. 9 of the outlet valve.

FIG. 8 and FIG. 9 respectively show the heat exchanger arrangement 51 as depicted in FIG. 6 and FIG. 7 in an open configuration (FIG. 8) and in a closed configuration (FIG. 9).

In FIG. 8 the fluid flow 52 acts as a coolant for a heat exchanger 56 and is regulated by a fan air valve 55. The exhaust fluid flow 52a is drawn by a pressure differential created by displacement of the flap 70 about the hinge 71. An end 74 of the flap 70 will be positioned such that a static pressure reduction is created. Typically, the end 74 will be arranged to extend towards a fan nozzle. In such circumstances, fluid flow for cooling effect in the heat exchanger 56 will be enhanced without providing a blockage to the by-pass duct in an engine.

FIG. 9 illustrates the heat exchanger arrangement depicted in FIGS. 6 to 8 and, in particular, the arrangement depicted in FIG. 8 in a closed configuration. Thus, the flap 70 generally lies upon the housing 14 in order that there is no flow 52a. The flap 70 is in kiss seal engagement with the wall 15 and possibly an end part 65a of the outlet ducting 65. In such circumstances between the open configuration depicted in FIG. 8 and the closed configuration depicted in FIG. 9 it will be understood that regulation of the fluid flow for cooling effect within the heat exchanger 56 can be adjusted with less detrimental effect upon by-pass flow rate in terms of drag whilst the exhaust flow 22b, 52a can be recovered in terms of adding to the thrust provided through the by-pass as it is located before the fan nozzle exit plane 60. It will also be understood that the fan air valve 55 in the second embodiment depicted in FIGS. 6 to 9 may be deleted such that fluid flow for cooling effect in the heat exchanger 56 is achieved generally through displacing the valve flap or door 70 about the hinge 71.

It will be understood that in accordance with aspects of the present invention there is a separation between the fluid flow exhausted from the heat exchanger from the ventilation zone within the housing for the heat exchanger which is typically the central nacelle mountings for that engine. This will reduce heating within the vent zone of that housing, will allow independent optimisation of vent and heat exchanger exhaust to maximise thrust recovery whilst minimising drag. Furthermore, for a given by-pass flow rate, aspects of the present invention will reduce the exhaust static pressure to increase the pressure drop across the heat exchanger which in turn should create an improved cooling efficiency within that heat exchanger. It will also be understood in view of the selectivity with regard to positioning the outlet valve arrangement in accordance with the present invention a further means for controlling flow rate through the heat exchangers is provided in addition to or in replacement of a fan air inlet valve as utilised with previous heat exchanger arrangements. Removal of the fan air inlet valve will enable a more compact design to be achieved with less blockage and a lighter weight penalty.

As indicated above, aspects of the present invention relate to a heat exchanger which can be applied to a situation where a coolant medium, that is to say a fluid flow, is ejected into a moving flow to minimise drag and constriction whilst facilitating thrust recovery.

The invention claimed is:

1. A gas turbine engine comprising:
   a bypass duct for a bypass fluid flow; and
   a heat exchanger arrangement mounted within a wall structure over which the bypass fluid flows during operation of the engine, the wall structure comprises:
   an inlet for supplying a coolant fluid flow to the heat exchanger during operation of the engine; and
   a duct leading to an outlet valve, wherein the outlet valve is moveable between an open position and a closed position, in the open position the outlet valve allows coolant fluid flow through the heat exchanger and in the closed position prevents coolant fluid flow through the heat exchanger, in the open position the valve protrudes into the bypass fluid flow to generate a reduction in static pressure therein to draw the coolant fluid flow through the heat exchanger during operation of the engine.

2. A gas turbine engine as claimed in claim 1 wherein the outlet valve is upstream of a fan nozzle exit plane.

3. A gas turbine engine as claimed in claim 1 wherein the engine comprises a housing and the outlet valve is in a wall of the housing.

4. A gas turbine engine as claimed in claim 1 wherein the outlet valve comprises a flap rotatable about its upstream edge.

5. A gas turbine engine as claimed in claim 1 wherein the static pressure is variable by specific displacement of the valve.

6. A gas turbine engine as claimed in claim 1 wherein the valve is opposite a shroud wall providing a fixed cross-sectional area within which the valve is operable.

7. A gas turbine engine as claimed in claim 1 wherein the wall structure is any one of a housing, a mounting structure, or a bifurcation structure.

8. A gas turbine engine as claimed in claim 6 wherein in the open position the outlet valve defines a converging passage with the shroud wall.

9. A gas turbine engine as claimed in claim 1 wherein the bypass duct comprises radially inner and outer walls and the outlet valve extends radially between the inner and outer walls.

10. A gas turbine engine as claimed in claim 9 wherein the outlet valve extends the complete radial height of between the walls.

11. A gas turbine engine as claimed in claim 4 wherein the flap is moveable between the closed position and the open position via an actuation mechanism comprising a motor and a drive arm connected to the flap.

12. A gas turbine engine as claimed in claim 3 wherein the heat exchanger includes a fan air valve and the outlet valve comprises a flap in kiss-seal engagement with the housing.

* * * * *